United States Patent [19]

Gardner et al.

[11] Patent Number: 4,763,682

[45] Date of Patent: Aug. 16, 1988

[54] THERMALLY RESPONSIVE VALVE ACTIVATING ASSEMBLY

[75] Inventors: James B. Gardner; Warren A. Dale, II, both of Fairplay, Colo.

[73] Assignee: Drain Brain, Inc., Fairplay, Colo.

[21] Appl. No.: 143,458

[22] Filed: Jan. 12, 1988

[51] Int. Cl.⁴ .............................................. E03B 7/12
[52] U.S. Cl. .................................. 137/62; 236/101 D; 237/80
[58] Field of Search ............... 137/59, 62; 236/101 D; 237/80; 251/11

[56] References Cited

U.S. PATENT DOCUMENTS

| | | | |
|---|---|---|---|
| 330,664 | 11/1885 | Bacon et al. | 137/62 |
| 503,932 | 8/1893 | Keeney | 137/62 |
| 1,200,928 | 10/1916 | Egan | 137/62 |
| 1,508,872 | 9/1924 | Bonelli | 137/62 |
| 1,558,276 | 10/1925 | Peterson | 137/62 |
| 1,820,473 | 8/1931 | Milone | 137/62 |
| 2,210,922 | 8/1940 | Joesting | 236/101 D |
| 2,214,844 | 9/1940 | Van Keuren et al. | 137/62 |
| 2,240,435 | 4/1941 | Borresen | 236/101 D |
| 2,276,872 | 3/1942 | Quinn | 236/101 D |
| 4,456,024 | 6/1984 | Roberts | 137/62 |

*Primary Examiner*—George L. Walton
*Attorney, Agent, or Firm*—Donald W. Margolis; Charles C. Corbin

[57] ABSTRACT

A valve activating system is provided, which is intended for association with a valve assembly including a valve housing defining a conduit therein which includes a fluid inlet opening and a fluid outlet opening, and a valve which is normally biased in a closed position in the conduit to control the flow of fluids therethrough. In order to activate the valve an opening is provided into the conduit for insertion of a valve activating element, such as a simple lever which is positioned at a location at which it can activate the valve. In the embodiment shown, the opening into the conduit has a circular cross-section and is fitted with a sealing O-ring. The lever is sized and shaped so that its insertion through the O-ring will complete a fluid tight closure of the opening so that fluid present in or flowing through the conduit cannot exit through the opening provided for the lever. Therefore the valve activating system remains dry. A mechanical thermostatic device is positioned at the other end of the lever, which at a predetermined temperature condition, causes the lever to pivot around the O-ring to activate the valve. The O-ring serves the dual function of a seal and of a fulcrum. The system is intended primarily for use as a freeze protection assembly for a water supply system.

20 Claims, 2 Drawing Sheets

THERMALLY RESPONSIVE VALVE ACTIVATING ASSEMBLY

BACKGROUND OF THE INVENTION (a) Field of the Invention

This invention relates to valve activating systems for use in fluid handling systems, which valve activating systems are responsive to changes in thermal conditions. More specifically it relates to freeze condition responsive safety systems in the form of thermostatically controlled valves which automatically purge water from water supply lines at the approach of freezing temperatures, and which terminate the purging action when the danger of freezing has passed.

(b) Discussion of the Prior Art

It is well known that when water freezes, it expands. This expansion can result in cracking and other damage to closed systems such as containers and pipes. When a water pipe freezes and cracks it causes, at a minimum, the inconvenience and expense of replacement, and if in a building structure can cause flooding and other related structural damage. It is not unusual for those seeking to avoid freeze damage to go to the time, trouble and expense of draining exposed water lines, or wrapping them with electrical resistive heating tape, or maintaining them in a constant "on" position so that the flow of water will prevent the build-up of ice in the pipes. Unfortunately, these methods can be inconvenient, expensive and unreliable.

A number of thermally activated devices for opening and closing valves and drains in response to changes in temperature are known in the art. In most instances, these devices have been directed at the prevention of damage to water systems as a result of freezing. For example, U.S. Pat. No. 503,932 discloses devices which can be connected to a water line, and which includes a linear bimetallic device which terminates in a valve closing element. The valve closing element of this patent is caused to open said valve and allow the drainage of fluid from a connected pipe in response to temperatures approaching the freezing point. In the system of this reference, the bimetallic thermostatic elements are located in such a manner that they are engulfed by fluid, both before and during their operation. U.S. Pat. No. 1,200,928 discloses a valve controlling mechanism for water pipes, which while isolated from contact with the fluid, is quite complex in its structure and operation. U.S. Pat. No. 1,508,872 discloses yet another freeze preventing thermostatic control device which utilizes a bimetallic system to actuate a valve to release fluid in response to low temperatures. However, the device of this reference is mechanically complex and allows the fluid to drain through the thermostatic mechanism.

Of perhaps greatest interest to the present invention is U.S. Pat. No. 2,214,844 which discloses an automatic drain device which utilizes a simple bimetallic coil mechanism having an extension thereof in contact with a valve activating device for the opening and closing of the valve in response to the approach of freezing temperatures. However, the thermostatic coil is located in a housing which is constantly immersed in liquid.

Other prior art which discloses temperature responsive drain valves includes U.S. Pat. No. 330,664 and U.S. Pat. No. 4,456,024.

It is thus seen that it would be desirable to have a simple, inexpensive system for draining water lines at the approach of freezing temperatures, and in which the activating mechanism is maintained out of contact with the fluid both during and after its activation.

SUMMARY OF THE INVENTION

In view of the foregoing, it is an object of the present invention to provide a simple device for activating a fluid valve in response to a thermal, and specifically, to a freezing, change in temperature.

It is another object of the present invention to provide such a device which is activated in response to a temperature change, without the requirement for external power or human intervention.

Another object of the present invention is to provide a system for activating a drain valve, which system is simple in construction and design and which lends itself to connection to a water line.

It is another object of the present invention to provide such a system which can be utilized in connection between a water supply line and a drain system.

It is yet another object of the present invention to provide a simple, inexpensive system for draining water lines at the approach of freezing temperatures, and in which the activating mechanism is maintained out of contact with the fluid both during and after its activation, and in which further, a single element in the mechanism serves the dual function of a seal and of a fulcrum.

The foregoing objects to the present invention are obtained by providing a valve assembly including a valve housing defining a conduit therein, the conduit including a fluid inlet opening and a fluid outlet opening, and with a valve in the conduit to control the flow of fluids therethrough. In order to activate the valve in the housing an opening is provided into the conduit for insertion of a valve activating element. In preferred embodiments a simple lever is placed through the opening so that it extends into the conduit at a location at which it can activate the valve. In preferred embodiments, the opening into the conduit will have a circular cross-section or cylindrical shape and be fitted with a resilient sealing O-ring. The lever is so sized and shaped that its insertion through the O-ring will complete a fluid tight closure of the opening so that fluid present in or flowing through the conduit cannot exit through the opening provided for the lever. A thermostatic device is positioned at the other end of the lever to cause it to pivot at the O-ring in response to a predetermined temperature condition, and thereby activate the valve. It is therefore seen that the O-ring provides the dual function of sealing fluid within the conduit and of also providing a fulcrum for the lever.

In one preferred embodiment of the invention the mechanism is included in a saddle valve which may be connected in line to a source of water which is warmer than ambient conditions. As detailed below, such a device allows the valve to open and drain water from the system until sufficiently warm water is provided in the conduit to avoid the possibility of freezing.

In preferred embodiments, the thermostatic device is a thermally responsive coil, for example a coil formed of bimetallic material. As detailed below, such a coil will, at a predetermined temperature, engage the lever to cause it to pivot around the fulcrum provided by the O-ring and activate the valve. In the saddle valve embodiment that is detailed, the system includes a check valve which is mounted in the housing conduit between the fluid inlet and the control valve. Such a check valve is normally biased in a closed position, but is caused to open by virtue of water under pressure when the control valve is opened.

These and other objects of the present invention will become apparent to those skilled in the art from the following detailed description, showing the contemplated novel construction, combination, and elements as herein described, and more particularly defined by the appended claims, it being understood that changes in the precise embodiments of the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENT

Figure 1:
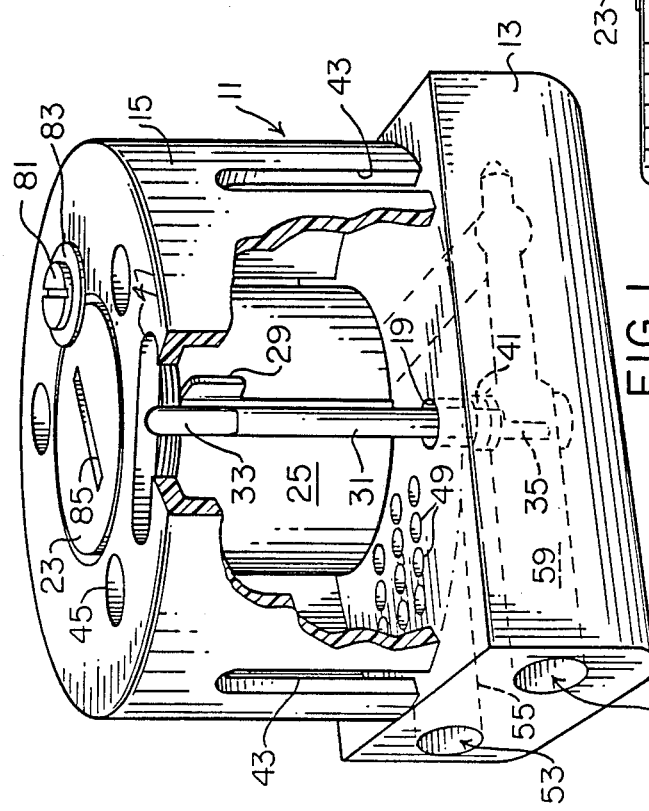
FIG. 1 is a perspective view, with parts broken away for the sake of clarity, of a thermally responsive valve activating device, which is associated with a valve, according to the present invention.

Referring to FIG. 1, there is shown a perspective view, with parts broken away, of one preferred embodiment of the thermally responsive device of the present invention in association with a saddle valve assembly, generally 11. The system includes a saddle valve housing 13 and a housing 15 for the thermally responsive valve activating device. These two components may be constructed of any suitable polymeric or other corrosion resistant material. Valve activating device housing 15 is joined to wall 17 of saddle valve housing 13 by the use of a suitable bonding agent or by mechanical means, not shown. A cylindrical opening 19 is defined through connecting wall 17 of saddle valve housing 13 and into valve activating device housing 15.

Figure 3:
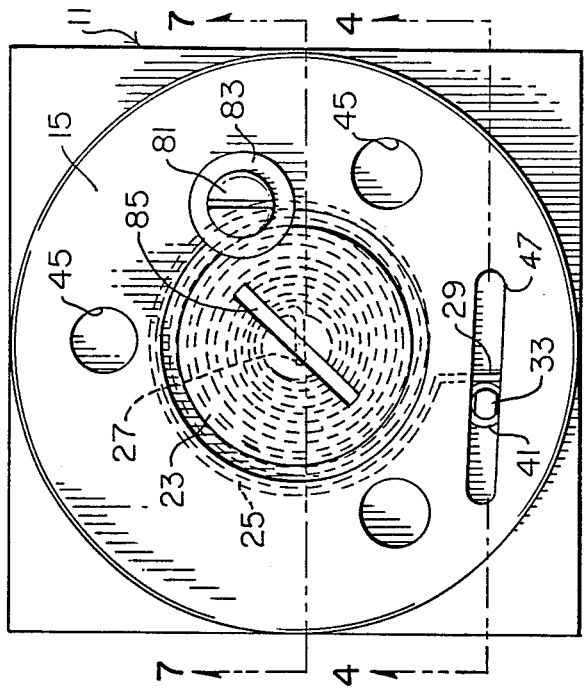
FIG. 3 is a top view, partially in phantom, of the device of FIG. 1.
Figure 7:
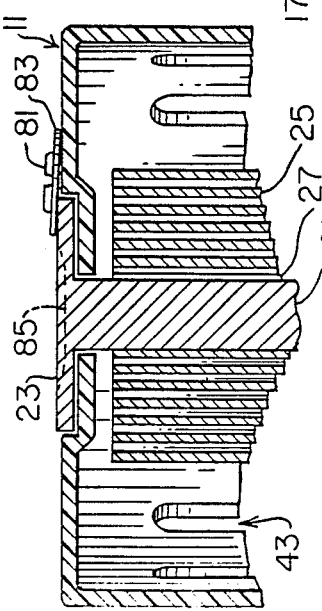
FIG. 7 is a partial sectional view taken along the line 7—7 of FIG. 3 and showing some additional details of the thermostat.

Referring to FIG. 7, a split hub 21 secured to a top plate 23 is shown. Top plate 23 rotatably resides in a recessed portion in the top of activating device housing 15, with connected split hub 21 rotatably extending through an opening in the top of housing 15. As most clearly illustrated in FIGS. 1, 3, and 7, a mechanical thermostatic device 25, in this case in the form of a bi-metallic coil, is located within housing 15. Thermostatic coil 25 is affixed by tang 27 at its inner end to split hub 21. A second tang 29 is present at the outer end of coil 25.

A control lever 31 is located primarily in activating device housing 15, into saddle valve 13. Control lever 31 includes a first end 33 which, depending on the temperature, is located adjacent to or in contact with tang 29 of coil 25. Control lever 31 also includes a second flattened end 35 which extends through cylindrical opening 19 of wall 17 to thereby operatively locate it within saddle valve 13. In preferred embodiments the outer surface of lever 31 includes a circumferential recess 37 which is located within opening 19 of wall 17 for contact with a sealing element, as detailed below.

Figure 4:
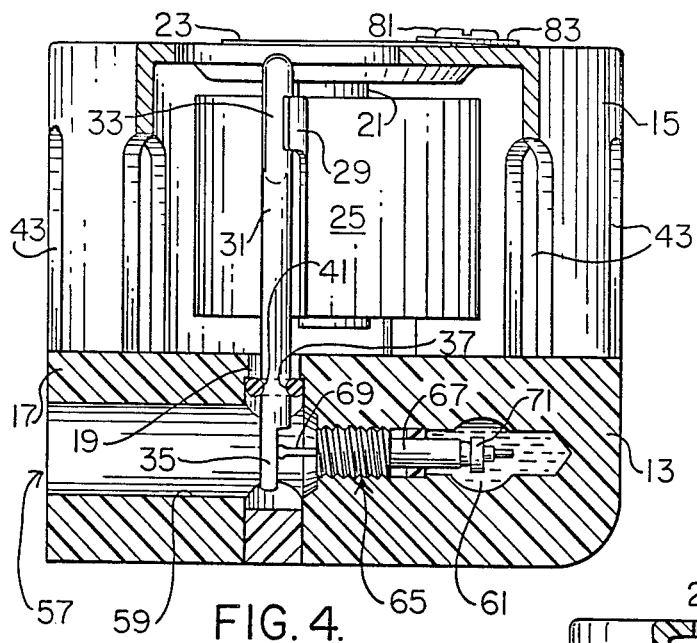
FIG. 4 is a sectional view taken along line 4—4 of FIG. 3 and showing the control valve in a closed position.
Figure 5:
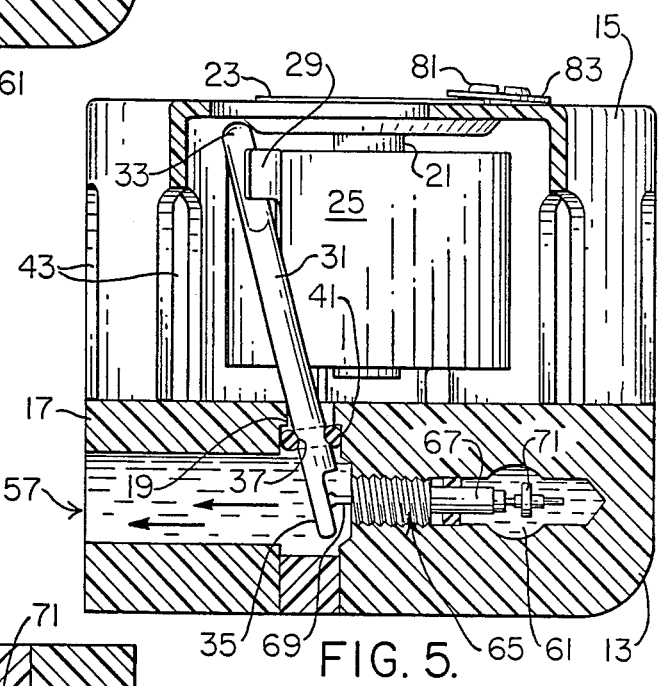
FIG. 5 is a sectional view, similar to FIG. 4, showing the control valve in an open position.

Referring to FIGS. 4 and 5, it will be seen that opening 19 of wall 17 is cylindrical and stepped, having a larger diameter at the portion facing into saddle valve housing 13. A sealing member 41 having substantially the same outer diameter as the inner diameter of cylindrical opening 19, resides snugly within the larger diameter portion of opening 19. In the embodiment shown sealing member 41 is in the form of an O-ring. O-ring 41 is seated against and positioned by the step provided at the transition from large diameter cylinder to small diameter cylinder of opening 19. The inner circumference of O-ring 41 embraces lever 31 at circumferential recess 37, thereby completing a seal between saddle valve housing 13 and the valve activating system. In this manner the thermostatic components within valve activating device housing 15 of assembly 11, including thermostatic coil 25, are isolated from the fluid and the fluid flow within saddle valve housing 13. It should be noted that in this arrangement O-ring 41, in addition to serving as a seal also functions as a fulcrum for the pivoting of control lever 31. O-ring 41 is preferably formed of resilient material such as rubber or artificial polymeric material.

Figure 2:
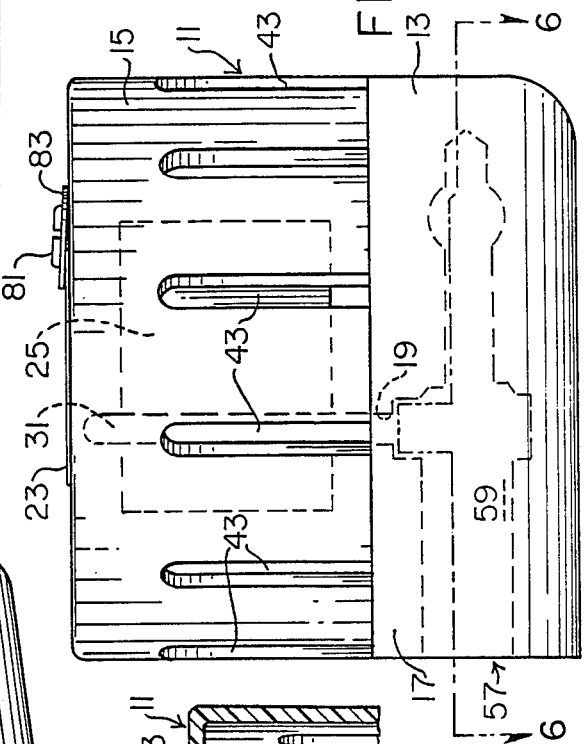
FIG. 2 is a side elevational view of the device of FIG. 1.

FIGS. 1 and 2 show valve activating device housing 15 to have a number of fairly large ventilation openings 43 around and through the circumference of its cylindrical sidewall, and also to have a number of ventilation openings 45 through its top wall. Openings 43 and 45 allow the interior of housing 15 and of thermostatic device 25 within housing 15 to experience ambient temperature conditions in the vicinity of assembly 11. The top wall of housing 15 also defines an elongated opening 47 which provides external access and guidance to first end 33 of lever 31. Additionally, the non-operative central portion of saddle valve housing 13 also defines a number of ventilation openings 49 into the interior of housing 15.

Figure 6:
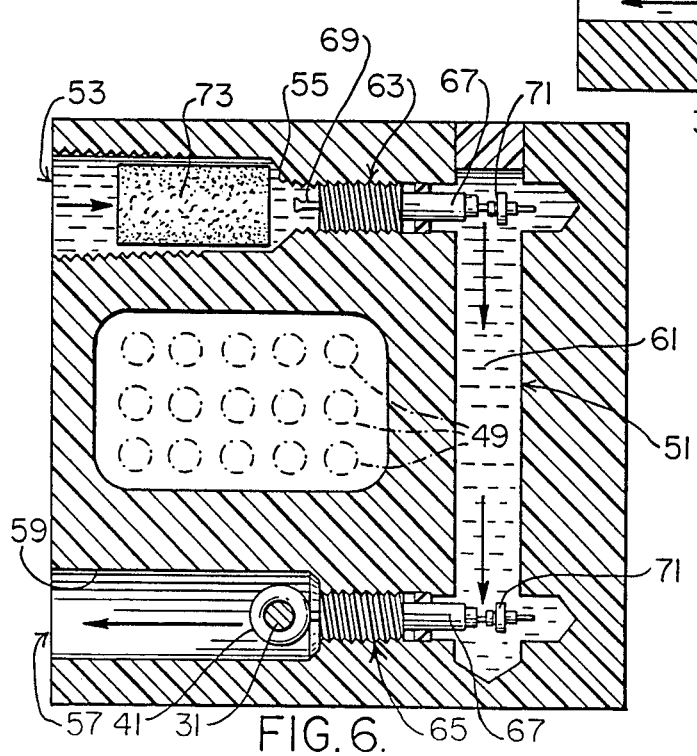
FIG. 6 is a sectional view taken along the line 6—6 of FIG. 2, and showing a saddle valve arrangement with the control valve in series with a check valve.

Now referring to FIG. 6, it can be seen that saddle valve housing 13 defines a U-shaped conduit, generally 51, including an inlet opening 53 into a first leg 55 and an outlet opening 57 from a second leg 59. First leg 55 and second leg 59 are continuously joined by tube 61. First leg 55 carries a threadedly mounted check valve 63 and second leg 59 carries a threadedly mounted control valve 65 in series with one another within U-shaped conduit 51. Valves 63 and 65 are of a conventional design, such as a pneumatic tire valve, and are shown as having a substantially identical construction, including a housing 67 for a valve stem 69 carrying a valve stop 71. Both valves 63 and 65 are normally biased in a closed position which, unless activated, prevent fluid from flowing through conduit 51. However, check valve 63 utilizes a biasing mechanism, such as a spring, which allows it to be opened by a small amount of pressure, say about three psi. It will be noted that second end 35 of control lever 31, depending on the temperature, is located adjacent to or in contact with valve stem 69 of control valve 65. When second end 35 of control lever 31 is located adjacent to or in non-activating contact with valve stem 69 of control valve 65, as shown in FIG. 4, control valve 65 remains in its normally closed position and prevents the flow of water through conduit 51. However, when second end 35 of control lever 31 is located in activating contact with valve stem 69 of control valve 65, as shown in FIGS. 5 and 6, valve stop 69 of control valve 65 is moved to an open position and allows the flow of water through conduit 51, as indicated by the arrows. As a part of this operation in a two valve saddle valve system, a stream of water under pressure, as indicated by the arrow in first leg 55 of FIG. 6 is provided, which water enters opening 53. The force of such pressurized water in the direction indicated by the arrows against stem 69 of check valve 63 will normally be sufficient to open connected stop 71 of valve 63 and fill tube 61 with water. However, until control valve 65 is activated into an open position, in accordance with the teaching of the present invention, as shown in FIGS. 5 and 6, the flow of water is stopped by closed control valve 65, and check valve 63 remains closed.

In use, assembly 11 is placed in the most effective location, that is where it will be exposed to ambient temperature conditions, and especially to cold and freezing temperatures. Its threaded inlet opening 53 is connected to a feeder line by a conventional threaded fitting, which in turn is connected to a water supply pipe, all of which are not shown. Outlet opening 57 is similarly designed to receive a fitting that is connectable, for example, to a drain system, all of which are not shown. Note, first leg 55 is shown to include a filter cartridge 73 so that valves 63 and 65 can be kept free of water-borne contaminates which might interfere with the operation of the valves.

The operation of the present invention can be best shown by reference to FIGS. 4, 5 and 6, in which it is assumed that inlet opening 53 of assembly 11 has been connected to a water supply and outlet opening 57 has been connected to a drain system. In the configuration shown in FIG. 4 the orientation of tang 29 on thermostatic coil 25 has been set so as to be activated at a temperature slightly above the freezing point of water, say about 36° F. (2.2° C.). As the ambient temperature approaches the activation temperature, coil 25 contracts thereby causing tang 29 at its free outer end to engage first end 33 of control lever 31. After such engagement has been made, as the temperature continues to drop lever 31, guided by slot 47, is pivoted around sealing member 41 in a counter-clockwise direction, as shown in FIG. 5. The pivoting of lever 31 around O-ring 41 causes its second end 35 to exert pressure against valve stem 69 of control valve 65 until its valve stop 71 is unseated, and control valve 65 is opened. The unseating of valve stop 71 allows pressurized water to flow completely through U-shaped conduit 51 in the direction indicated by the arrows in FIG. 6, and out of outlet opening 57, as shown in FIGS. 5 and 6. It will be appreciated that the pressure of the water will cause check valve 63 to open almost simultaneously with the opening of control valve 65.

When ambient temperature rises sufficiently coil 25 will expand and allow lever 31 to return substantially to the position shown in FIG. 4, thereby allowing control valve 65 to close. When control valve 65 is closed the flow of water through conduit 51 will be stopped, the pressure of the water on stem 69 of check valve 63 will be stopped, and therefore check valve 63 will also close. It will also be apparent that, flow in the opposite direction, including the flow of contaminated water and harmful gasses, for example from a sewage line connected to outlet opening 57, is blocked by check valve 63.

Note, in the system shown if the inlet side of the valve is connected to a source of warm water, then during the time that the control valve is open the warm water from the supply line which passes through assembly 11 will warm coil 25 by conduction. After coil 25 is sufficiently heated it will cause lever end 35 to pivot out of contact with stem 69 of control valve 65 and close that valve.

It is desirable to be able to adjust the temperature at which the system of the present invention is activated. In this embodiment there is provided at the top of saddle valve housing 13 adjacent top plate 23 at set screw 81 and an associated washer 83. Washer 83 contacts both the top of plate 23 and the top of housing 13. Noting that the top of plate 23 lies slightly above the top surface of housing 15, it will be understood that the tightening of set screw 81 will cause washer 83 to bear against the top surfaces of both housing 13 and of top plate 23 to thereby secure plate 23, connected hub 21 and attached coil 25 against gross mechanical rotation. A slot 85 is provided in top plate 23 for use in adjusting the orientation of coil 25 when set screw 81 is loosened. The orientation of coil 25 is essentially a thermostatic adjustment which locates the outer end tang 29 of coil 25 at a set distance from control lever 31. The expansion characteristics of coil 25 and the distance of coil end 29 from lever 31 will determine the temperature at which the device is activated. In a modification of the invention, not shown, a dial and associated temperature gradation information may be provided on the top surfaces of housing 15 and top plate 23. As discussed above, under non-freezing temperature conditions second tang 29 at the end of coil 25 is adjusted so that it is out of contact with first end 33 of control lever 31, as shown in FIGS. 1 and 4. In this position lever end 35 does not exert activating pressure on valve stem 69 of control valve 65.

In the embodiment shown, thermostatic device 21 is a coil constructed of a bi-metallic material having a fairly high coefficient of expansion of the type and construction which is commonly employed in thermostatic devices. Other art known mechanical thermostatic devices, such as rods and switches may also be successfully employed in the invention. Such devices may also utilize other material which provides a thermostatic or temperature responsive function.

It is therefore seen that the present invention provides a simple device for activating a fluid valve in response to a thermal, and specifically, to a freezing, change in temperature, without the requirement for external power or human intervention. The system is simple in construction and design and lends itself to connection between a water supply line and a drain system. Furthermore the present invention provides a simple, inexpensive system for draining water lines at the approach of freezing temperatures, and one in which the activating mechanism is maintained out of contact with the fluid both during and after its activation, and in which further, a single element in the mechanism serves the dual function of a seal and of a fulcrum.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

What is claimed is:

1. In a fluid valve system including in combination, a valve housing defining a conduit having a fluid inlet opening and a fluid outlet opening; a control valve located in said conduit for controlling the flow of fluid through said conduit, said valve including activating means for opening and for closing said valve in response to the presence or absence of mechanical pressure on said activating means, and an opening into said conduit in the vicinity of said activating means, said opening being defined by said housing and having an inner circumferential surface, wherein the improvement comprises:

means for substantially sealing fluid flow through said opening into said conduit, said sealing means having an outer circumferential surface and also defining an inner opening, said outer circumferential surface of said sealing means being in substantially fluid tight contact with said inner circumferential surface of said opening into said conduit, and with said inner opening of said fluid sealing means defining an opening therethrough;

a lever having a first end, a second end, and a outer circumferential surface, said lever extending through said inner opening defined by said fluid sealing means with a portion of the circumferential outer surface of said lever in substantially fluid tight contact with said inner circumferential surface of said fluid sealing means to thereby seal said opening into said conduit, said first end of said lever being juxtaposed to said valve activating means for contact with and separation from said valve activating means in response to the pivotal rotation of said lever around said fluid sealing means, whereby said fluid sealing means serves as a fulcrum for said lever; and a thermally responsive element juxtaposed to said valve housing and maintained in fluid isolation from said conduit by the combination of said fluid sealing means and said lever which seal the opening through the housing into said conduit, said thermally responsive mechanical element including means which are caused to undergo mechanical movement in response to changes in temperature, said mechanically moving means being juxtaposed to said second end of said lever to make contact with said second end of said lever and to end contact with said second end of said lever in response to predetermined temperature conditions; whereby, at a predetermined temperature said thermally responsive element causes said mechanical moving means to make contact with a portion of said second end of said lever and thereby pivotally rotate said lever at its connection to said fluid sealing means so that said first end of said lever exerts pressure on or releases pressure from said valve activating means to open or close said valve activating means.

2. The fluid valve system as defined in claim 1 wherein said sealing means is a resilient O-ring.

3. The fluid valve system as defined in claim 1 wherein said thermally responsive element is a coiled metallic spring having one portion thereof positioned and adapted to engage said control lever.

4. The fluid valve system as defined in claim 1 wherein said thermally responsive element includes bi-metallic material.

5. The fluid valve system as defined in claim 4 wherein said bi-metallic material is in the form of a strip.

6. The fluid valve system as defined in claim 5 wherein said bi-metallic strip is in the form of a coiled spring.

7. The fluid valve system as defined in claim 1 including a check valve mounted in said conduit at a location between said conduit inlet and said control valve, said check valve normally being biased in a closed position, but being openable by force of inflowing water under pressure.

8. A freeze protection valve assembly comprising:

a valve housing having a flow channel with an inflow end, an outflow end, and an opening in the housing to said flow channel;

a control valve mounted within said flow channel, said control valve having a valve stem which carries a valve stop, said valve stop being normally biased in a position which is closed, but which valve stem and valve stop is movable to an open position in response to pressure exerted upon said valve stem;

a control lever extending through said opening in the housing of said channel adjacent the valve stem of said control lever;

a resilient member having an opening defined therethrough, which resilient member seals said opening through the housing to said channel, and which said resilient member has said control lever mounted therethrough to complete the sealing of said opening through the housing of said channel, and which said resilient member also provides a fulcrum for pivoting of said lever; and a thermally responsive member positioned and adapted to operatively engage one end of said control lever when the temperature of said thermally responsive member approaches the freezing point of water, whereby said lever is pivoted at said resilient member to bring its opposed end into engagement with said valve stem to thereby open said valve.

9. A fluid valve activating system for association with a valve assembly which includes a fluid conduit having an inlet opening and an outlet opening, a mechanically activated pressure valve located in the conduit to control the flow of fluids therethrough, and an opening into the conduit for mechanical access to the mechanically activated pressure valve, said fluid valve activating system including in combination:

a sealing element, said sealing element being located at and seated within the opening into the conduit, said sealing element having an opening defined therethrough;

a valve activating element, said valve activating element including a first portion which is located outside of the conduit, and a second portion located within the conduit element and adjacent to or in contact with the pressure valve, said second portion extending through said opening defined through said sealing element, said valve activating element thereby forming with said sealing element a fluid tight closure of the opening into the conduit to substantially retain fluids within the conduit, said sealing element also serves as a fulcrum for said valve activating element; and a mechanical thermostatic device which is located outside of the conduit and in fluid isolation from the conduit due to the seal formed by said combined sealing element and said valve activating element extending through said opening defined through said sealing element, said mechanical thermostatic device being positioned to interact with said first portion of said valve activating element at a predetermined temperature to cause mechanical activation of said first portion of said valve activating element and thereby of said connected second portion which is adjacent to or in contact with the pressure valve; whereby pressure is applied to or removed from said mechanically activated pressure valve.

10. The fluid valve activating system of claim 9 wherein said opening defined through said sealing element is an annular opening.

11. The fluid valve activating system of claim 10 wherein the opening into the conduit has a circular cross-section and said sealing element located in the opening is an O-ring.

12. The fluid valve activating system of claim 11 wherein said activating element is a lever.

13. The fluid valve activating system of claim 12 wherein said lever and said O-ring form a fluid tight closure of the opening into the conduit to substantially retain fluids within the conduit; and wherein further said O-ring also serves as a fulcrum for said lever.

14. The fluid valve activating system of claim 9 wherein said sealing element is formed of resilient material.

15. The fluid valve system of claim 9 wherein said thermostatic device includes a coiled metallic thermally resposive spring having one portion thereof positioned and adapted to engage said first portion of said valve activating element.

16. The fluid valve system of claim 9 wherein said thermostatic device includes bi-metallic material.

17. The fluid valve system as defined in claim 16 wherein said bi-metallic material is in the form of a strip.

18. The fluid valve system as defined in claim 17 wherein said bi-metallic strip is in the form of a coiled spring.

19. The fluid valve activating system of claim 9 wherein said valve activating element is a lever.

20. The fluid valve activating system of claim 9 wherein the valve is normally biased in a closed position, and wherein further when said second portion of said activating element is adjacent to the pressure valve the pressure valve is closed, and when said second portion of said activating element is in contact with the pressure valve the pressure valve is opened.

* * * * *